T. C. WILLIAMS.
WATER CLOSET CISTERN.
APPLICATION FILED JAN. 8, 1913.
1,092,317.
Patented Apr. 7, 1914.
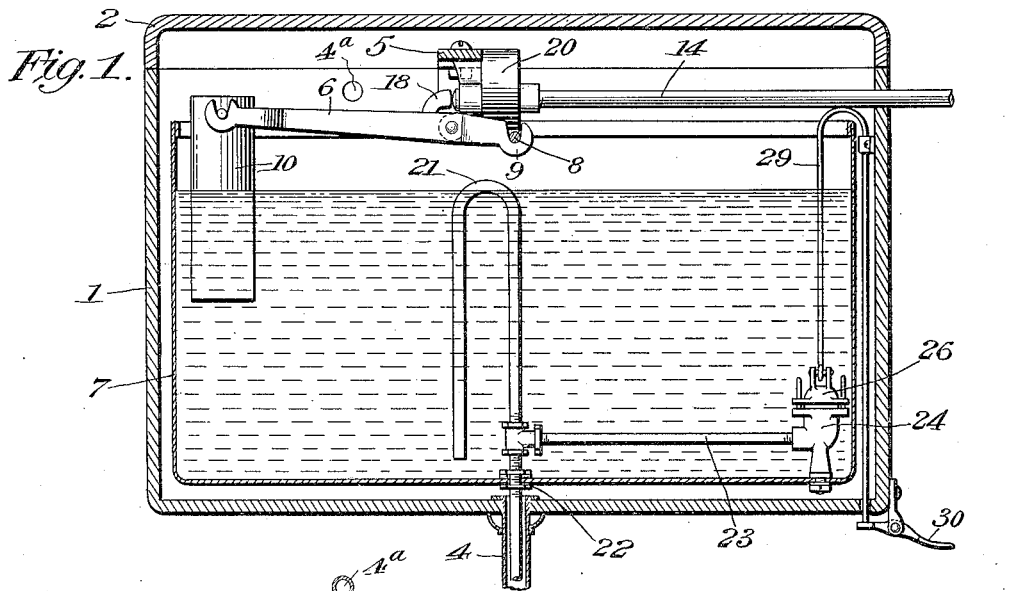
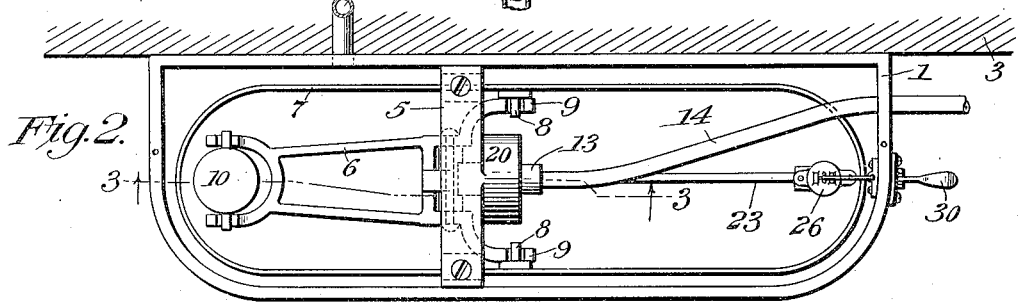
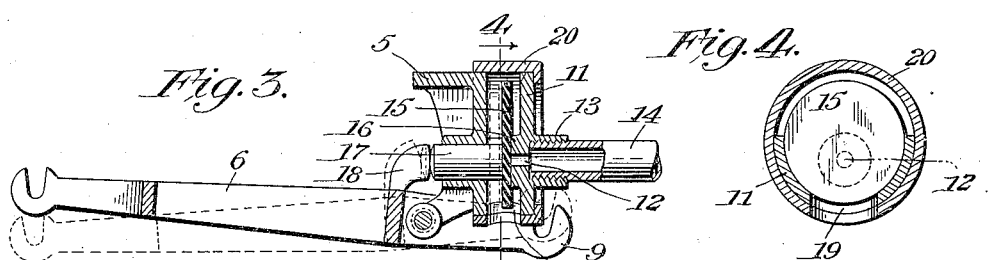
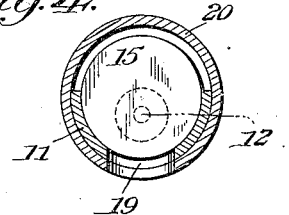
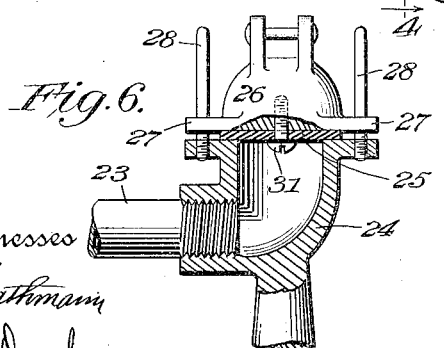
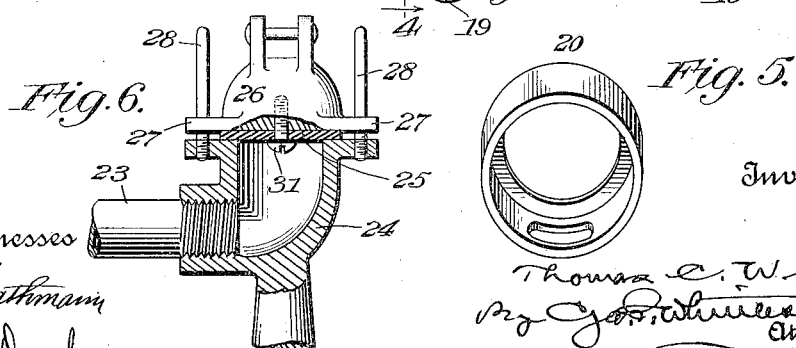
Witnesses
P. J. Gathmann
H. E. Dunham
Inventor
Thomas C. Williams
By Geo. F. Winsbury
Attorney

UNITED STATES PATENT OFFICE.

THOMAS C. WILLIAMS, OF GARFIELD, UTAH, ASSIGNOR OF ONE-HALF TO BENJAMIN G. CALL, OF GARFIELD, UTAH.

WATER-CLOSET CISTERN.

1,092,317. Specification of Letters Patent. Patented Apr. 7, 1914.

Application filed January 8, 1913. Serial No. 740,891.

*To all whom it may concern:*

Be it known that I, THOMAS C. WILLIAMS, a citizen of the United States, residing at Garfield, in the county of Salt Lake and State of Utah, have invented certain new and useful Improvements in Water-Closet Cisterns, of which the following is a specification.

This invention relates to flushing tanks or cisterns for water closets and its object is to simplify the mechanism now ordinarily used in such structures, and to provide a closet cistern which will be reliable in operation, simple and strong in construction, and readily repaired and kept in order.

I avoid the use of a ball float, which is a source of trouble; I avoid the use of special packings for the valves.

The water is contained in a tank which is suspended on one arm of a lever, with a counterweight on the other arm to balance the greater part of the weight of the tank and its contents. The tank is emptied by a siphon which can be started by lifting a plain disk valve. When the major portion of the water has left the tank, the counterweight lifts it, and in so doing open the inlet valve, which remains open until the tank is nearly full again. When the weight of the water overbalances the counterweight, the tank sinks and the inlet valve is closed. A simple flat disk of rubber or leather serves for the inlet valve, and the siphon priming valve is a similar disk, so that a worn valve can be easily renewed without the use of tools, other than a small screwdriver.

In the accompanying drawing, Figure 1 is a longitudinal section of my improved flushing tank. Fig. 2 is a plan view of the same. Fig. 3 is a view on a larger scale of the lever and inlet valve, the parts being shown in section along the line 3—3, Fig. 2. Fig. 4 is a section on the line 4—4, Fig. 3. Fig. 5 is a perspective view of the cover for the inlet valve, and Fig. 6 is a sectional view of the siphon priming valve.

The tank proper is preferably inclosed in a box 1 having a removable cover 2 and fastened to any suitable support 3. It has a pipe 4 leading from its bottom to the closet which is to be flushed. Across the top of the box 1 is fastened a yoke 5 which serves as a fulcrum for a lever 6 whose arms are preferably bifurcated, as shown. The short arm of the lever supports the tank 7 which has a loose fit in the box 1 so as to be capable of free movement up and down therein. The tank is preferably provided with short trunnions 8 which rest in hooks 9 at the end of the lever arm. The long arm of the lever supports in a similar fashion a weight 10 which preferably depends into the tank.

Formed integral with or attached to the yoke is a valve casing 11, consisting preferably of a cylindrical chamber in one head of which is an opening 12 provided with a screw threaded nozzle 13 to receive the water supply pipe 14. A flat disk 15 of rubber or other suitable packing material is laid against the inner face of the aforesaid head, so as to control the opening 12, which is preferably surrounded by a circular valve seat 16. The disk valve is pressed against this seat by a plunger 17 working freely in an opening in the opposite head of the chamber. A finger 18 on the lever rests against the outer end of this plunger, so that when said lever is in its highest position the plunger will force the valve against its seat, but when the tank rises and the lever drops the pressure of the water can push the valve open. The upper portion of the wall of the valve chamber is cut away down to a diametrical line, so that the disk valve can be easily dropped into it or lifted out. In the under side of said wall is a port 19 through which the water can enter the tank. A cylindrical cover 20 slips over the valve casing and closes the upper cutaway portion, but has an opening registering with the port 19 to permit the escape of the water. This cover can be readily slid back to expose the valve when it is desired to get at it.

The siphon discharge pipe 21 for the tank is an inverted U having one leg opening near the bottom of the tank and the other passing through a packed joint 22 and loosely telescoping in the pipe 4. A priming pipe 23 connects with the siphon inside the tank and has an upturned end, preferably a casting 24 supported on the bottom of the tank. This casting is faced off to form a seat for the flat disk valve 25, similar to the valve 15 and carried by a heavy cap 26 which is preferably provided with perforated lugs 27 riding on vertical pins 28 secured in the casting 24. An upright rod 29 is pivotally attached to the cap 26 and rises above the top of the tank to a point where it can be operated by the hand of the person wishing to flush the tank. The rod is preferably doubled upon itself and carried down through one or more guides through the bottom of the box 1 where it is engaged by a hand lever 30 pivotally supported upon said box. A ventilating pipe 4ª leads from the interior of the box 1 to the roof of the building.

The operation of the device is as follows:—To flush the closet the operator pushes up the rod 29 by means of the hand lever 30 thereby lifting the valve 25 and admitting water from the tank to the priming pipe 23. The downward rush of water through the longer leg of the siphon pipe 21 creates a vacuum at the upper bend of said pipe which starts an upward current in the shorter leg of the siphon and thereafter the siphon operates automatically to empty the tank down to or near to the level of the lower end of the short leg. When the tank is nearly empty its weight becomes so much reduced that the counterweight 10 drops, thereby slightly lifting the tank and withdrawing the finger 18 from the plunger 17, so that the valve 15 can open by reason of the pressure of the water coming through the supply pipe 14. The entering water finds its way into the tank through the port 19 and fills it gradually until the weight of the water overbalances the counterweight 10 and the tank sinks to the position in which it appears in Fig. 1, thereby causing the finger 18 to close the valve 15 again. This action is hastened by the loss of buoyancy of the counterweight caused by its partial immersion in the water.

It will be seen that the construction is quite simple, and that the only parts likely to wear are easily accessible. The two valves are substantially alike being plain flat disks and can be readily replaced by others when necessary, the only tool required being possibly a small screwdriver to operate the screw 31 which holds the siphon valve to the cap 26. The water will always stand at a given level in the tank, the only chance for this level to vary being due to a difference in the water pressure, and owing to the leverage at which the tank acts on the plunger, a small increase in the amount of water will produce a decided increase in pressure on said plunger, so that it requires quite a large change in the water pressure to necessitate any appreciable change in the water level. Pipes 4 and 4ª completely ventilate the bowl.

In accordance with the provisions of the patent statutes I have described the principle of operation of my invention and what I regard as the best mode of carrying it into effect; but it is to be understood that the apparatus shown is only illustrative and that the invention can be effected by other means.

Having thus described my invention, what I claim is:—

1. A water closet cistern comprising a lever, a water tank suspended from one end of said lever, a counterweight hung from the other end of said lever and depending into the water in said tank, and a water supply valve controlled by the movements of said lever.

2. A water closet cistern comprising a vertically movable water tank, a lever on one end of which said tank is suspended, a counterweight hung from the other end of said lever and depending into the water in said tank, a water supply pipe, a valve seated against the end of said pipe, and a finger for controlling said valve, located on the lever on the same side of its fulcrum as the counterweight.

3. A water closet cistern comprising a counterbalanced water tank, a supply pipe therefor, a valve casing attached to said pipe and having a port in its lower side and its upper side cut away, a flat valve dropped loosely into said casing, a cover sliding over said casing and closing said cutaway portion and having an opening to register with said port, and means controlled by the movements of said tank for actuating said valve.

In testimony whereof I affix my signature in presence of two witnesses.

THOMAS C. WILLIAMS.

Witnesses:
BENJAMIN G. CALL,
GILBERT PALMER.